J. DIERINGER.
SHOCK ABSORBER.
APPLICATION FILED AUG. 10, 1915.

1,203,711.

Patented Nov. 7, 1916.

WITNESS

INVENTOR
John Dieringer
BY
ATTORNEY

UNITED STATES PATENT OFFICE.

JOHN DIERINGER, OF TACOMA, WASHINGTON.

SHOCK-ABSORBER.

1,203,711.    Specification of Letters Patent.    Patented Nov. 7, 1916.

Application filed August 10, 1915. Serial No. 44,686.

*To all whom it may concern:*

Be it known that I, JOHN DIERINGER, a citizen of the United States, and a resident of Tacoma, in the county of Pierce and State of Washington, have invented certain new and useful Improvements in Shock-Absorbers, of which the following is a full, true, and exact specification.

My invention relates to shock absorbers and has for its principal object, to provide a simple, cheap and effective device of the character described, in which a coiled spring is put under a compressive strain at all times no matter whether the tendency of the device is to compression or extension.

My device is particularly well adapted to automobile use in which a reversal of stress on the shock absorbers occurs frequently.

Other objects will appear as my invention is more fully explained in the following specification, illustrated in the accompanying drawings and pointed out in the appended claim.

Figure 1:
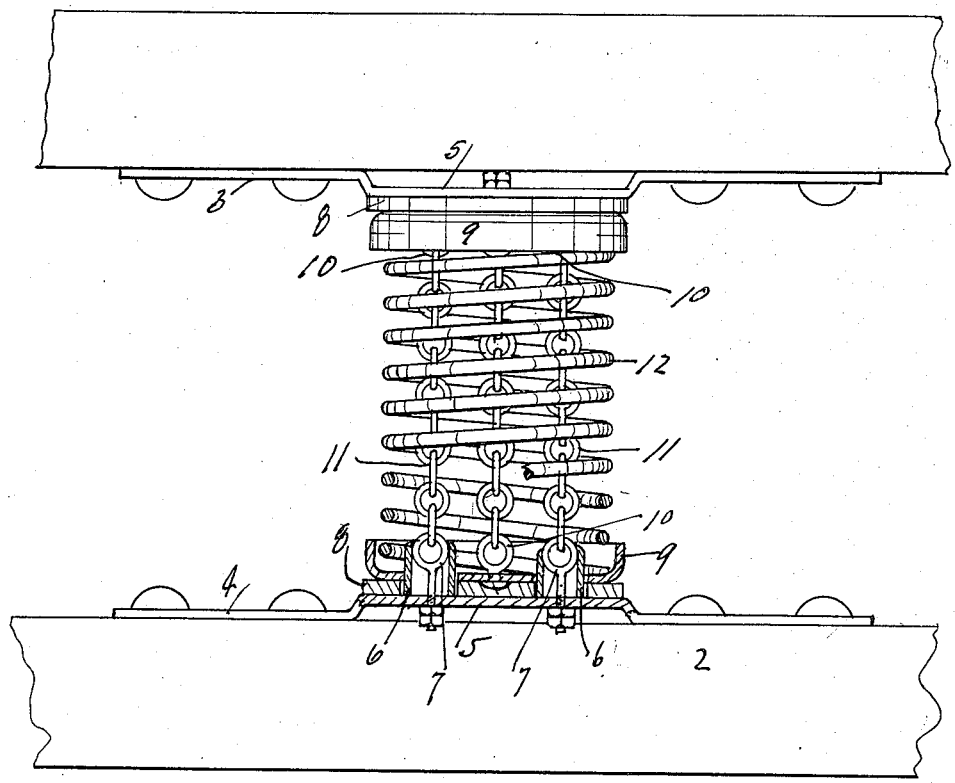
Figure 2:
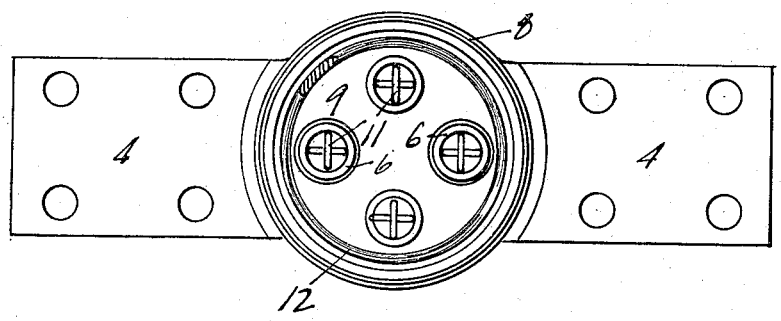

In the drawings, Figure 1 is a side elevation of my device shown attached to fragments of an automobile chassis with parts broken away. Fig. 2 is a sectional plan of Fig. 1.

Referring more particularly to the drawings, numerals 1 and 2 indicate two members of an automobile between which it is desired to absorb road shocks. 3 and 4 indicate end plates of my absorber which are secured to members 1 and 2 respectively. The end plates are cupped centrally as at 5. Secured to cups 5 are thimbles 6 through which eye bolts 7 project. The eye bolts 7 are adjustably secured to end plates 3 and 4. Resilient washers 8 fit over thimbles 6 and down against end plates 3 and 4. Flanged heads 9 fit loosely over thimbles 6 and against the resilient washers 8. Secured to heads 9 are eyelets 10. Chains 11 connect an eyebolt 7 on one end of my device with an eyebolt 10 on the other end, thus the head 9 of one end is flexibly connected to the end plate of the other end. A coiled spring 12 inserted between the heads 9, completes the device. When the device is compressed, the spring resists the shock and transfers it at each end through the heads, washers and end plates. When the device is under tension, the chains hold the heads in spaced relation to the end plate to which they are attached and as the end plates separate farther apart, the heads are drawn together near the center of the device with a resultant compression of the spring 12. It is thus seen that no matter in which direction the stress acts, the spring 12 is under compression. It is a well known fact that a spring will last longer and retain its elasticity better when under compression only. The thimbles 6 hold the washers 8 and heads 9 in line against sidewise movement. The washers 8 act as cushions and prevent the device from being noisy.

While I have shown a particular form of embodiment of my invention, I am aware that many minor changes therein will readily suggest themselves to others skilled in the art without departing from the spirit and scope of the invention, and I therefore desire to avoid being limited to the exact form shown and described except as pointed out in the appended claim.

Having described my invention, what I claim as new and desire to protect by Letters Patent, is:—

In a shock absorber adapted for automobile use, the combination of a pair of oppositely disposed cupped end plates attachable to the chassis of an automobile, thimbles secured to the inner sides of said end plates, cupped heads arranged between and concentric with the said end plates and having perforations through which the said thimbles normally project, resilient washers interposed between the said heads and end plates, whereby the striking together directly of the end plates and heads is prevented, a coiled spring interposed between the said heads, flexible members within the said coiled spring and adjustably connecting one end plate to the oppositely disposed head, other similar members similarly connecting the other end plate and head, the ends of said flexible members which are secured to the end plates passing through said thimbles.

JOHN DIERINGER.

Copies of this patent may be obtained for five cents each, by addressing the "Commissioner of Patents, Washington, D. C."